United States Patent Office 3,585,212
Patented June 15, 1971

3,585,212
2-THIENYL THIONOPHOSPHINE SULFIDE
Hajime Hirai, Minoo-shi, Japan, and Hirosuke Yoshioka, Austin, Tex., assignors to Sumitomo Chemical Company, Ltd., Osaka, Japan
No Drawing. Filed Oct. 18, 1968, Ser. No. 768,900
Claims priority, application Japan, Oct. 31, 1967, 42/70,436
Int. Cl. A01n 9/12; C07d 63/12
U.S. Cl. 260—329P
1 Claim

ABSTRACT OF THE DISCLOSURE

A novel compound of 2-thienyl thionophosphinesulfide having the formula,

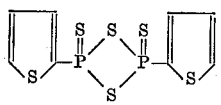

which is useful as an insecticide and a fungicide as well as an intermediate for the production of insecticides, fungicides and the like.

---

This invention relates to a novel compound of 2-thienyl thionophosphinesulfide having the formula,

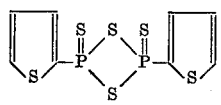

and a process for producing the same.

So far, the method for linking carbon atom and phosphorus atom of phosphorus pentasulfide has been known, for instance in the Journal of the American Chemical Society, vol. 74, 4933 (1952), it is disclosed to react cyclohexene with phosphorus penta sulfide for such long time as 108 hours to prepare $\Delta^2$-cyclohexenyl thionophosphinesulfide in 58% yield.

Further, in the said literature, vol. 78, 5018 (1956), it is also disclosed to react an aromatic hydrocarbon compound such as benzene, anisole and naphthalene with phosphorus penta sulfide at considerably high temperature in order to complete the reaction, namely in case of reacting anisole or naphthalene with phosphorus penta sulfide, the reaction is completed at boiling point thereof, and in case of reacting benzene with phosphorus penta sulfide, at 225° C. in the autoclave.

While, the present inventors have found that the linkage of carbon atom and phosphorus atom can be completed easily at unexpectedly lower temperature than that of the known method when thiophene is reacted with phosphorus penta sulfide, thereby to obtain a novel 2-thienyl thionophosphine-sulfide having above-mentioned formula in higher yield compared with said known method.

Further, the present inventors have found that the present compound can be produced in purer state than that of the known compounds prepared by the above-mentioned method which are, generally, so impure that the structure thereof cannot be known without conversion to another derivative thereof.

A basic object of the present invention is to embody 2-thienyl thionophosphinesulfide having the above-mentioned formula and another object of the invention is to embody a process for producing the same. These and other objects will be apparent to those conversant with the art to which the present invention pertains from the subsequent description.

The objective 2-thienyl thionophosphinesulfide can be prepared from thiophene and phosphorus penta sulfide according to the following scheme:

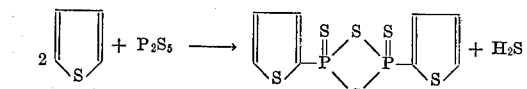

In carrying out the present invention, an amount of thioprene may be not less than 2 mol. per mol. of phosphorus penta sulfide, but it is preferable that 10 to 20 mol. of thiophene is employed in practice.

Generally speaking, decrease the amount of thiophene employed is attended with deterioration of purity of the product obtained because of progress of the side reaction or the polymerization reaction and increase of the same is attended with decrease of yield per reaction volume. The reaction can be completed within a temperature range of between 80° and 150° C., preferably under reflux.

The completion of the reaction can be confirmed by disappearance of hydrogen sulfide from the reaction system. The reaction time is usually 45 to 50 hours.

After the reaction is over, separation by filtration gives yellowish green crystals of the objective 2-thienyl thionophosphinesulfide.

The present compound obtained may be employable for insecticide and fungicide as well as an intermediate for the production of insecticides, i.e. a novel insecticide of O-ethyl-O'-p-nitrophenyl-2-thienyl phosphonothioate according to the following scheme:

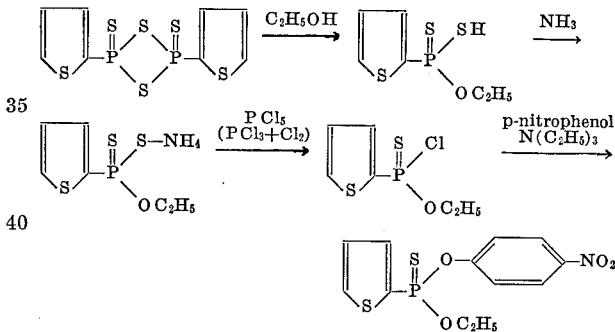

A practical and presently-preferred embodiment of this invention is illustratively shown in the following example.

EXAMPLE

A mixture of 320 cc. of thiophene and 44 g. of phosphorus penta sulfide was refluxed on the oil bath at 85° C. Appearance of hydrogen sulfide was confirmed at the same time as starting of reflux and colour of the reaction mixture turned to dark brown from yellow. After 20 hours from starting of reflux, yellowish green leaflet crystals were produced for the first time.

Disappearance of hydrogen sulfide was confirmed after 48 hours from starting. The reaction mixture was cooled, and subjected to filtration to separate crystals, which were washed with small amount of thiophene and dried under reduced pressure. Thus, 61.5 g. of yellowish green leaflet crystals was obtained. M.P. 205° C. (decomposed)

*Elementary analysis.*—Calculated (percent): C, 26.95; H, 1.69; P, 17.38. Found (percent): C, 26.41; H, 1.63; P, 17.18.

Infrared absorption (Nujol sample): 3100, 1495, 1395, 1330, 1213, 1090, 1010, 860, 720, 685 cm.$^{-1}$.

Comparative test

Over a rice plants (variety: Waseasahi) grown to a 3 to 4 leaves-stage in a 9 cm. (in diameter) flower pot, each 7 ml./pot of emulsions containing test chemicals at a desired concentration adjusted with water were individually sprayed. After two hours, a suspension containing spores of *Pyricularia oryzae* was inoculated into the rice plants to investigate the fungicidal effects and after incubating for five days, spots caused by the *Pyricularia oryzae* were observed. The results were as follows.

| Compound | Concentration of active ingredient (p.p.m.) | Number of disease spots per 10 leaves |
|---|---|---|
| Present compound | 1,000 | 24 |
|  * | 1,000 | 28 |
| Control | 0 | 106 |

*The fungicide produced and sold by Ihara Noyaku Co., Ltd. in Japan under the trademark Kitazin.

What we claim is:

1. A compound of the formula,

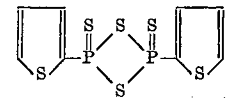

References Cited

UNITED STATES PATENTS 2,847,458 8/1958 Chao et al. ---------- 260—500

JOHN D. RANDOLPH, Primary Examiner

C. M. SHURKO, Primary Examiner

U.S. Cl. X.R.

424—202; 260—332.5